United States Patent Office 3,632,612
Patented Jan. 4, 1972

1

3,632,612
ANTHRAQUINONE DYESTUFFS
John Lindley Leng, Manchester, and Cyril Eric Vellins, Gatley, England, assignors to Imperial Chemical Industries Limited, London, England
No Drawing. Filed Sept. 27, 1967, Ser. No. 671,134
Claims priority, application Great Britain, Sept. 28, 1966, 43,379/66
Int. Cl. C09b 1/54, 1/56
U.S. Cl. 260—380                              5 Claims

ABSTRACT OF THE DISCLOSURE

Anthraquinones substituted in the 1 position by an amino or alkylamino group, in the 4 position by a hydroxy, ether, thioether, amino or substituted amino group and in the 2 position by a phenoxy or phenylthio group carrying a primary, a secondary or tertiary amino group are prepared from the corresponding anthraquinones substituted in the 2 position by a halogen or sulphonic acid group by reaction with the appropriate phenol or thiophenol, and are converted into their quaternary salts by alkylating agents. The products, before or after quaternisation, are useful for the coloration of polymeric materials.

---

This invention relates to new anthraquinone dyestuffs which are valuable for the coloration of polymeric materials in the form of fibres, films, threads or tapes and particularly of polymeric materials consisting of polyesters, polyamides, cellulose esters or polymers or copolymers of acrylonitrile or dicyanoethylene.

According to the invention there are provided new anthraquinone dyestuffs free from sulphonic or carboxylic acid groups of the formula:

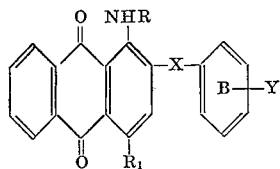

wherein R is hydrogen, or an alkyl, substituted alkyl, cycloalkyl or substituted cycloalkyl group, $R_1$ is a hydroxyl, alkoxy, substituted alkoxy, aryloxy, substituted aryloxy, alkylmercapto, arylmercapto, substituted arylmercapto, amino, alkylamino, substituted alkylamino, cyclohexylamino, substituted cyclohexylamino, arylamino or substituted arylamino group, X is an oxygen or sulphur atom, Y is a primary, secondary or tertiary amino group or quaternary ammonium group attached at the nitrogen atom, and wherein the nucleus A is optionally substituted by one or two chlorine atoms and the nucleus B is optionally further substituted by one or more non-ionic substituents.

2

As examples of groups which may be represented by R there may be mentioned alkyl groups such as methyl, ethyl or n-propyl, n-butyl, or isopropyl, substituted alkyl groups such as β-hydroxyethyl, β-ethoxyethyl or benzyl, cycloalkyl groups such as cyclohexyl, or substituted cycloalkyl groups such as α-methylcyclohexyl. It is preferred that R be a methyl group or, especially, a hydrogen atom.

The dyestuffs in which $R_1$ represents an arylamino or substituted arylamino group are of particular value since these dyestuffs when used on polyacrylonitrile materials give especially attractive reddish-blue shades. As examples of such arylamino and substituted arylamino groups there may be mentioned phenylamino, o-, m- and p-tolylamino, 2,5 - dimethoxyphenylamino, 2,4,6 - trimethylphenylamino, 4 - phenylamino. 4 - anilinophenylamino, 4-phenylmercaptophenylamino, α- and β-naphthylamino, and o-, m- and p-chlorophenylamino.

Also preferred are the dyestuffs in which $R_1$ represents an alkylamino or substituted alkylamino group such as methylamino, ethylamine, n-propylamino, isopropylamino, n-butylamino and β-hydroxyethylamino.

As examples of other groups which may be represented by $R_1$ there may be mentioned alkoxy and substituted alkoxy such as methoxy, ethoxy and β-hydroxyethoxy, aryloxy and substituted aryloxy such as phenoxy, tolyloxy, o-, m- and p-chlorophenoxy, o-, m- and p-methoxyphenoxy, and α- and β-naphthoxy, alkylmercapto such as methylmercapto and ethylmercapto, arylmercapto and substituted alkylmercapto such as phenylmercapto and p-chlorophenylmercapto, and cycloalkylamino and substituted cycloalkylamino such as cyclohexylamino and α-methylcyclohexylamino.

As groups which may be represented by Y there may be mentioned amino groups and secondary and tertiary amino groups such as methylamino, dimethylamino, diethylamino, piperidino, morpholino and bis-β-hydroxyethylamino in the form of the free bases or their salts with acids such as hydrochloric, sulphuric, phosphoric or arylsulphonic acids and, preferably, quaternary ammonium groups such as trimethylammonium, methyldiethylammonium, triethylammonium and diethylbenzylammonium as salts with anions such as chloride, bromide, sulphate, methosulphate, p-toluene sulphonate, phosphate or tetrachlorozincate. The group represented by Y may be in any of the three positions of the nucleus B, but is preferably in the 4-position.

As optional substituents which may be present on the ring B there may be mentioned alkyl groups such as methyl, and ethyl, alkoxy groups such as methoxy and ethoxy and halogen groups such as chlorine or bromine.

The dyestuffs in which rings A and B carry no optional substituents are preferred.

As examples of dyestuffs of the invention there may be mentioned the compounds of Formula 1 listed in Table 1 which gives the values of R, $R_1$, X and Y and the optional substituents in the nucleus A and nucleus B. Unless otherwise stated the substituents are hydrogen atoms and where necessary the position of the substituents on the ring is indicated by the figures in parenthesis.

TABLE I

| R | R₁ | Optional substituent in nucleus B | X | Y | Optional substituent in nucleus A | |
|---|---|---|---|---|---|---|
| | p-Toluidino | | O | $NH_2$ | (3) | |
| | do | | O | $\overset{\oplus}{N}(CH_3)_3$ | (3) | |
| | do | | O | $N(C_2H_5)_2$ | (3) | |
| | do | | | $\overset{\oplus}{N}(C_2H_5)_2(CH_3)$ | (3) | |
| | do | | O | $NHCH_3$ | (4) | |
| | do | $CH_3$ (2) | O | $NH_2$ | (4) | |
| | do | $CH_3$ (2) | O | $\overset{\oplus}{N}(CH_3)_3$ | (4) | |
| | do | | O | $NH_2$ | (4) | Cl (5) |
| | do | | O | $\overset{\oplus}{N}(CH_3)_3$ | (4) | Cl (5) |
| | do | | O | $NH_2$ | (4) | Cl.Cl (5,8) |
| | do | | O | $\overset{\oplus}{N}(CH_3)_3$ | (4) | Cl.Cl (5,8) |
| | $NHCH_3$ | | O | $\overset{\oplus}{N}(CH_3)_3$ | (4) | |
| | $NH.C_2H_4OH$ | | O | $\overset{\oplus}{N}(CH_3)_3$ | (4) | |
| $CH_3$ | p-Toluidine | | S | $NH_2$ | (4) | Cl (5) |
| $CH_3$ | do | | S | $\overset{\oplus}{N}(CH_3)_3$ | (4) | Cl (5) |
| Cyclohexyl | p-Anisidino | | O | $NH_2$ | (4) | |
| Do | do | | O | $\overset{\oplus}{N}(CH_3)_3$ | (4) | |
| | 2,5-dimethoxyanilino | | O | $NH_2$ | (4) | |
| | do | | O | $\overset{\oplus}{N}(CH_3)_3$ | (4) | |
| | o-Chloroanilino | | O | $NH_2$ | (4) | |
| | do | | O | $\overset{\oplus}{N}(CH_3)_3$ | (4) | |
| | α-Naphthylamino | | O | $NH_2$ | (4) | |
| | do | | O | $\overset{\oplus}{N}(CH_3)_3$ | (4) | |
| | 4-diphenylamino | | O | $NH_2$ | (4) | |
| | do | | O | $\overset{\oplus}{N}(CH_3)_3$ | (4) | |
| | 4-phenoxyanilino | | O | $NH_2$ | (4) | |
| | do | | O | $\overset{\oplus}{N}(CH_3)_3$ | (4) | |
| | 4-phenylmercaptoanilino | | O | $NH_2$ | (4) | |
| | do | | O | $\overset{\oplus}{N}(CH_3)_3$ | (4) | |
| | 4-phenylaminoanilino | | O | $NH_2$ | (4) | |
| | do | | O | $\overset{\oplus}{N}(CH_3)_3$ | (4) | |
| | $NHC_2H_5$ | | O | $NH_2$ | (4) | |
| | $NHC_2H_5$ | | O | $\overset{\oplus}{N}(CH_3)_3$ | (4) | |
| | $NHCH_3$ | | S | $NH_2$ | (4) | |
| | $NHCH_3$ | | S | $\overset{\oplus}{N}(CH_3)_3$ | (4) | |
| | OH | | O | $NH_2$ | (4) | |
| | OH | | O | $\overset{\oplus}{N}(CH_3)_3$ | (4) | |
| | Phenylmercapto | | O | $NH_2$ | (4) | |
| | do | | O | $\overset{\oplus}{N}(CH_3)_3$ | (4) | |
| | Phenoxy | | O | $NH_2$ | (4) | |
| | do | | O | $\overset{\oplus}{N}(CH_3)_3$ | (4) | |
| | $NH_2$ | | O | $NH_2$ | (4) | |
| | $NH_2$ | | O | $\overset{\oplus}{N}(CH_3)_3$ | (4) | |
| | $OCH_3$ | | O | $NH_2$ | (4) | |
| | $OCH_3$ | | O | $\overset{\oplus}{N}(CH_3)_3$ | (4) | |

The dyestuffs of the invention wherein Y is a primary, secondary or tertiary amine may be prepared by reacting a compound of the formula:

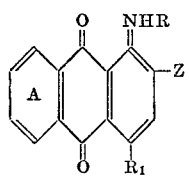

wherein A, R and R₁ have the significances given above and Z is a halogen or sulphonic acid group in presence of a basic compound with, preferably in excess, a compound of the formula:

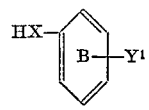

wherein B has the significance given above and $Y^1$ is a primary, secondary or tertiary amino group.

It is preferred to carry out the reaction in a strongly basic medium, such as pyridine in presence of sodium or potassium hydroxide at temperatures between 20 and 150° C., and preferably between 100° and 150°. The product may be isolated by precipitation from the reaction mixture by water or a lower alcohol, and purified if necessary from unreacted phenol or thiophenol by stirring with alkali.

The dyestuffs in which Y is a quaternary ammonium group may be obtained by alkylation of the dyestuffs wherein Y is a primary, secondary or tertiary amino group, suitable alkylating agents being alkylhalides such as methyl iodide, ethyl iodide or ethylbromide, cycloalkylhalides such as benzylchloride, alkylsulphates such as dimethylsulphate, diethylsulphate and diisopropylsulphate and arylsulphonic acid esters such as methyl, ethyl or butyl p-toluene sulphonate.

The alkylation may be effected in an inert organic solvent such as benzene, toluene, xylene, chlorobenzene, nitrobenzene, acetone, carbon tetrachloride, tetrachloroethane or β-ethoxyethanol, but in certain cases it is possible and even preferable to use a medium consisting of the alkylating agent or of water or an aqueous organic solvent. The alkylating agent is preferably used in considerable excess, for example about 6 moles for each mol. of dyestuff. It is desirable to add also an acid-binding agent such as magnesium oxide or sodium carbonate. Suitable temperatures for alkylation are from 20° to 150° C.

When the alkylation is effected in organic solvents the dyestuff, together with any excess of acid-binding agent, is normally insoluble and may be isolated by filtration, and separated from the acid-binding agent by extraction with water and salting out or by extraction with hot ethanol followed by cooling to precipitate the dyestuff.

The dyestuffs are valuable for the coloration of textile materials especially those comprising polymers and copolymers of acrylonitrile and of dicyanoethylene and polyesters and polyamides and modified, such as acid-modified, polymers and copolymers of these.

The dyestuffs of the invention wherein Y is a primary, secondary or tertiary amino group may be applied as disperse dyes to polyacrylonitrile, polyamide, cellulose ester or, particularly, polyester fibres and are preferably used in a finely-divided form in the presence of a dispersing agent. Suitable dyestuffs preparations may be made by known methods for example by grinding the dyestuff either in dry or wet form with or without the addition of dispersing agent. Dyeing may be effected from acidic, neutral or slightly alkaline dyebaths (i.e. pH from 3 to 8) at temperatures between 70 and 100° C., if desired with the use of a swelling agent, or at a temperature of above 100° C. at super-atmospheric pressure.

The water-soluble dyes of the invention wherein Y is a quaternary ammonium group may be applied to polyamide, cellulose ester or, particularly, polyacrylonitrile materials from acid, neutral or slightly alkaline dyebaths (i.e. pH from 3–8) at temperatures between 40–120° C. and preferably between 80–120° C. or by printing techniques using thickened print pastes. Attractive red to greenish-blue dyeings with very good wet and light fastness and good build-up properties are obtained.

The invention is illustrated but not limited by the following examples in which the parts are by weight unless otherwise stated.

EXAMPLE 1

20.4 parts of 1-amino-2-bromo-4(4'-toluidino)anthraquinone, 40.8 parts of p-aminophenl and 10.2 parts of potassium hydroxide are stirred in 40 parts of pyridine at a temperature between 125 and 135° C. for 18 hours. The mixture is cooled to 80° C. and 80 parts of ethanol are added. After cooling to room temperature, the crude product is filtered off, washed with 160 parts of ethanol and stirred with 200 parts of 2 N-sodium hydroxide for 1 hour at room temperature. The product is filtered off, washed with 2 N-sodium hydroxide until the filtrate is alkali-free. The crystalline product is dried at 80°.

A dispersion of the dyestuff dyes polyethylene terephthalate in reddish-blue shades of good heat fastness properties.

Instead of the 1-amino-2-bromo-4-(4'-toluidino)-anthraquinones used above there may be used 1-amino-2-bromo-4-(4'-anisidino)anthraquinone (Example 2), 1-amino-2-bromo-4-anilinoanthraquinone (Example 3), or 1-amino-2-bromo-4-(2',4',6'-trimethylanilino)anthraquinone (Example 4). The products are similar to that obtained in Example 1.

EXAMPLE 5

15.75 parts of p-chloronitrobenzene are added to a solution of 55 parts of sodium sulphide in 220 parts of water, and the mixture is stirred and refluxed for 20 hours. The mixture is then steam-distilled to remove any unchanged starting material, and cooled to below 12°.

To this mixture is added a warm suspension of 20 parts of 1-amino-2-bromo-4-(4'-toluidino)anthraquinone in 510 parts of pyridine over 5 minutes, the temperature being kept in the range between 12 and 15° C. The mixture is stirred at this temperature for 1 hour and then between 80 and 90° C. for 3 hours. After cooling to between 0 and 5° C., the mixture is filtered and the cake slurried into 500 parts of 1.5 N-sodium hydroxide, stirred at room temperature for 20 minutes, filtered off, washed with warm water until the filtrate is alkali-free, and with a little alcohol. After drying at 80° C., 16.5 parts of 1-amino-2-(4' - aminophenyl)mercapto - 4-(4'-toluidino)anthraquinone is obtained.

EXAMPLE 6

13.8 parts of the anthraquinone dyestuff obtained in Example 1 and 14 parts of magnesium oxide are stirred in 600 parts of acetone at the boiling point and 37.4 parts of dimethyl sulphate added. The mixture is stirred and boiled under reflux for 20 hours and filtered. The cake is washed with 400 parts of acetone and dissolved in 500 parts of boiling water. After boiling for 10 minutes, the mixture is filtered hot. The cake is extracted in this manner with two further 500 parts of boiling water. The filtrates are combined and, on cooling, 14 parts of the dyestuff, 1-amino - 2(4' - trimethylammoniumphenoxy)-4-(4'-toluidino)anthraquinone methosulphate crystallises out. This is collected and dried at 70–80° C.

The product dyes polyacrylonitrile fibres from a weakly acid bath in reddish-blue shades of good fastness properties and also dyes polyester fibres from an alkaline dyebath in reddish blue shades of good heat fastness properties.

Instead of the anthraquinone dyestuff obtained in Example 1 above there may be used the anthraquinone dyestuffs obtained in Examples 2, 3, 4 or 5 to provide dyestuff Examples 7, 8, 9 or 10 which dye acrylonitrile fibres from a weakly acid bath in respectively reddish-blue, reddish-blue, blue-violet or blue shades of good fastness properties.

What we claim is:

1. An anthraquinone dyestuff free from sulphonic or carboxylic acid groups of the formula:

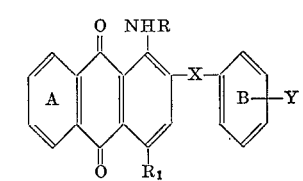

wherein R is hydrogen, methyl, ethyl, butyl, propyl, β-hydroxyethyl, β-ethoxyethyl, benzyl, cyclohexyl or α-methylcyclohexyl, $R_1$ is phenylamino, tolylamino, 2,5-dimethoxyphenylamino; 2,4,6-trimethylphenylamino; 4-phenylamino; 4-anilinophenylamino; 4-phenylmercaptophenylamino; α- and β-naphthylamino; chlorophenylamino; methylamino, ethylamino, propylamino, butylamino, β-hydroxyethylamino, methoxy, ethoxy, β-hydroxyethoxy, phenoxy, tolyloxy, chlorophenoxy, methoxyphenoxy, α- or β-naphthoxy, methylmercapto, ethylmercapto, phenylmercapto, p-chlorophenylmercapto, cyclohexylamino or α-methylcyclohexylamino; X is an oxygen or sulphur atom, Y is trimethylammonium, methyldiethylammonium, triethylammonium or diethylbenzylammonium as salts with chloride, bromide, sulphate, methosulphate, p-tolune sulphonate, phosphate, or tetrachlorozincate and wherein the nucleus A is unsubstituted or substituted by one or two chlorine atoms and the nucleus B is unsubstituted or substituted by methyl, ethyl, methoxy, ethoxy, chlorine or bromine.

2. An anthraquinone dyestuff as claimed in claim 1 where R is a methyl group.

3. An anthraquinone dyestuff as claimed in claim 1 wherein Y is in the 4-position of the nucleus B.

4. An anthraquinone dyestuff as claimed in claim 1 wherein the nuclei A and B are free from optional substituents.

5. The anthraquinone dyestuff 1-amino-2-(4'-trimethyl - ammoniumphenoxy)-4-(4'-methoxyanilino)-anthraquinone methosulphate.

References Cited

UNITED STATES PATENTS

| 2,888,467 | 5/1959 | Richter | 260—380 |
| 2,972,622 | 2/1961 | Grossmann | 260—380 |
| 3,018,154 | 1/1962 | Downey et al. | 260—378 X |
| 3,125,586 | 3/1964 | Katz et al. | 260—377 |

FOREIGN PATENTS

| 1,477,434 | 4/1967 | France | 260—380 |
| 1,268,400 | 6/1961 | France | 260—380 |
| 3,623,899 | 12/1961 | Japan | 260—380 |

LORRAINE A. WEINBERGER, Primary Examiner

R. GERSTL, Assistant Examiner

U.S. Cl. X.R.

8—39, 40; 260—247.1, 247.5 R, 272, 371, 373, 374, 378, 379, 381